US008548731B2

(12) United States Patent
Ruizenaar

(10) Patent No.: US 8,548,731 B2
(45) Date of Patent: Oct. 1, 2013

(54) NAVIGATION METHOD, NAVIGATION SYSTEM, NAVIGATION DEVICE, VEHICLE PROVIDED THEREWITH AND GROUP OF VEHICLES

(75) Inventor: Marcel Gregorius Anthonius Ruizenaar, Zoetermeer (NL)

(73) Assignee: Nederlandse Organisatie voor toegepast-natuurwetenschappelijk onderzoek TNO (NL)

( * ) Notice: Subject to any disclaimer, the term of this patent is extended or adjusted under 35 U.S.C. 154(b) by 116 days.

(21) Appl. No.: 13/131,404

(22) PCT Filed: Nov. 26, 2009

(86) PCT No.: PCT/NL2009/050722
§ 371 (c)(1),
(2), (4) Date: Aug. 15, 2011

(87) PCT Pub. No.: WO2010/062179
PCT Pub. Date: Jun. 3, 2010

(65) Prior Publication Data
US 2011/0288728 A1 Nov. 24, 2011

(30) Foreign Application Priority Data
Nov. 26, 2008 (EP) ...................................... 08170013

(51) Int. Cl.
*G01C 21/26* (2006.01)
(52) U.S. Cl.
USPC ........................................................ 701/400
(58) Field of Classification Search
USPC ............. 701/400, 412, 420, 23–26; 340/988, 340/991
See application file for complete search history.

(56) References Cited

U.S. PATENT DOCUMENTS 6,801,855 B1 10/2004 Walters et al.
7,066,004 B1 6/2006 Kohler et al.
(Continued)

FOREIGN PATENT DOCUMENTS

GB 1135117 11/1968
GB 2443864 11/2006
(Continued)

OTHER PUBLICATIONS

Kohler, MEMS Inertial Sensors with Integral Rotation Means, Sandia Report SAND2003-3388, Sep. 2003.
(Continued)

*Primary Examiner* — Yonel Beaulieu
(74) *Attorney, Agent, or Firm* — Waddey & Patterson, P.C.; Rebecca M. Barnett; James R. Cartiglia

(57) ABSTRACT

A navigation system is described comprising at least a first and a second navigation device (201A, 201B) that each is capable of determining an initial estimation ($P_{1A}, P_{1B}$) of their own position,—the first navigation device (201A) having a facility (225A) for transmitting its relevant navigation information ($P_{1A}$) to the second navigation device (201B),—the second navigation device (201B) having a facility (225B) for receiving the relevant navigation information ($P_{1A}$),—at least one of the first and second navigation device (201A, 201B) having a facility (210A, 210B) for providing a proximity signal (Spr, S'pr) that indicates whether the first and second navigation device are within proximity of each other,—the second navigation device having a dead reckoning facility (210B) for calculating the initial estimation ($P_{1B}$) of its position and a facility (250B) for improving an accuracy of estimating its own position using relevant navigation information ($P_{1A}$) provided by the first navigation device (201A) for positions for which the proximity signal (Spr) was given.

18 Claims, 10 Drawing Sheets

(56) References Cited

U.S. PATENT DOCUMENTS

2003/0179133 A1 9/2003 Pepin et al.
2004/0130485 A1* 7/2004 Rapoport et al. ........ 342/357.03
2005/0197771 A1* 9/2005 Seick et al. .................. 701/301

FOREIGN PATENT DOCUMENTS

| WO | WO0127649 | 4/2001 |
| WO | WO0190773 | 11/2001 |
| WO | WO2006064265 | 6/2006 |

OTHER PUBLICATIONS

Sanderson: Advanced Robotics, Jan. 1, 1998 VSP, Zeist, NL, vol. 12, No. 4, pp. 335-349, XP-002530333.
International Search Report for PCT/NL2009/050722 dated Jan. 18, 2010.

* cited by examiner

NAVIGATION METHOD, NAVIGATION SYSTEM, NAVIGATION DEVICE, VEHICLE PROVIDED THEREWITH AND GROUP OF VEHICLES

BACKGROUND

1. Field of the Invention

The present invention relates to a navigation method,
The present invention further relates to a navigation system,
The present invention further relates to a navigation device,
The present invention further relates to a vehicle provided with a navigation device,
The present invention further relates to a group of vehicles.

2. Related Art

Nowadays GPS navigation facilities are available that can relatively accurately determine a position of a vehicle. However, in some circumstances alternative navigation methods are required as GPS-navigation signals are not always available, for example at locations below sea level and in buildings. One such alternative method applies dead-reckoning using data obtained from inertial sensors. Inertial sensors comprise gyroscopes and accelerometers. Gyroscopes provide information about the orientation of the vehicle and accelerometers provide information about its acceleration. If the initial position and velocity of a vehicle are known, its instantaneous velocity and position can be estimated by numerical integration of the acceleration and orientation data obtained from the accelerometers and gyroscopes. Generally accelerometers have a systematic error, also denoted as bias, resulting in a drift in position indication, exponential in time. Accordingly, such navigation devices based on inertial sensors need to be calibrated periodically to measure and compensate the sensor biases. With low-cost sensors, and without bias compensation, the navigation solution becomes useless within minutes. This also applies to dead reckoning methods using other sensors, e.g. odometers for measuring speed and a compass for measuring direction.

In "A distributed algorithm for cooperative navigation among multiple mobile robots" by Sanderson. Advanced robotics ISSN 0169-1864, 98, vol. 12, no 4, pp. 313-481 (17 ref.), pp. 335-349, a method is described for improving the navigation accuracy of robots by sensing of relative inter-robot positions and intercommunication of position estimates and planned trajectories. Although in this way a potentially better navigation result can be obtained than would be the case if the robots navigated independently, the method is complicated and the measurement of relative position may form another source of errors.

Accordingly, there is a need for improvement.

SUMMARY OF THE INVENTION

According to a first aspect of the invention a first method of cooperative navigation is provided, comprising the steps of
a. providing at least a first and a second navigation device, each having at least a navigation sensor, for providing navigation data indicative of a movement state of the navigation sensor, and transmitting navigation data,
b. independently moving the first and the second navigation device in a shared environment,
c. detecting whether the first and the second navigation device encounter each other, and transmitting a proximity signal indicative for an encounter of the first and the second navigation device,
d. at least estimating a position of the second navigation device using a dead-reckoning method, and if the proximity signal indicates an encounter improving an accuracy of said estimation using navigation information from the first navigation device.

According to the first aspect of the invention a second method of cooperative navigation is provided, comprising the steps of
a. providing a central server and at least a first and a second navigation device, each of the navigation devices having at least a navigation sensor, for providing navigation data indicative of a movement state of the navigation sensor, and transmitting said navigation data to the central server,
b. independently moving the first and the second navigation device in a shared environment,
c. detecting whether the first and the second navigation device encounter each other, and transmitting to the central server a proximity signal indicative for an encounter of the first and the second navigation device,
d. at least estimating a position of the second navigation device using a dead-reckoning method, and if the proximity signal indicates an encounter improving an accuracy of said estimation using navigation information from the first navigation device.

According to the first aspect of the invention a third method of cooperative navigation is provided, comprising the steps of
a. providing at least a first and a second navigation device, each capable of estimating their own position using a dead-reckoning method,
b. independently moving the first and the second navigation device in a shared area,
c. detecting whether the first and the second navigation device encounter each other,
d. if the detection is positive communicating relevant navigation information obtained by the first navigation device at the moment of said detection to the second navigation device, said relevant navigation information comprising at least an estimation of the position of the location of encounter by the first navigation device,
e. improving an accuracy with which the second navigation device estimates its own position using the position estimation received from the first navigation device.

According to a second aspect of the invention a first navigation system is provided comprising at least a first and a second navigation device, each having at least a navigation sensor, the navigation devices each being arranged to be moved mutually independent from each other and at least the first navigation device being arranged for transmitting navigation data indicative of its state, the navigation system having a facility for receiving the transmitted navigation information, at least one of the first and second navigation device having a facility for providing a proximity signal that indicates whether the first and second navigation device encounter each other, the navigation system at least having a dead reckoning facility for calculating an initial estimation of a position of the second navigation device and a facility for improving an accuracy of this estimation using the navigation information transmitted by the first navigation device for positions for which the proximity signal was given.

According to a second aspect of the invention a second navigation system is provided comprising at least a first and a second navigation device and a central server, the first and the second navigation device each having at least a navigation sensor, the navigation devices each being arranged to be moved mutually independent from each other and being arranged for transmitting navigation data indicative of their state to the central server, at least one of the first and second navigation device having a facility for transmitting a proximity signal to the central server that indicates whether the first and second navigation device encounter each other, the navigation system at least having a dead reckoning facility for calculating an initial estimation of a position of the second navigation device and a facility for improving an accuracy of this estimation using the navigation information transmitted by the first navigation device for positions for which the proximity signal was given.

According to the second aspect of the invention a third navigation system is provided comprising at least a first and a second navigation device that each has a dead-reckoning facility for determining a first initial estimation of their own position, the first navigation device having a facility for transmitting its relevant navigation information to the second navigation device, the second navigation device having a facility for receiving the transmitted initial estimation, at least one of the first and second navigation device having a facility for providing a proximity signal that indicates whether the first and second navigation device encounter each other, the second navigation device having a facility for improving the accuracy of estimating its own position using the relevant navigation information provided by the first navigation device for positions for which the proximity signal was given, said relevant navigation information comprising at least an estimation of the position of the location of encounter by the first navigation device.

According to the above-mentioned aspects of the invention, the updating of the first initial estimation is exclusively based on the comparison of navigation information between vehicles obtained at the moment of encounters between them. This latter method allows for a substantially simpler implementation while having good results. In the method according to the present invention it is not necessary to have expensive facilities for determining a relative position. It is sufficient to have a simple proximity sensor, e.g. a sensor that merely provides for a binary signal indicative whether there is an encounter or not. Such a sensor may be based for example on RF technology. Furthermore, the calculation of the improved navigation result is simplified, as in case of an encounter the real coordinates of the vehicles have substantially the same value. Accordingly for each encounter the difference between the estimated positions of the vehicles is substantially determined by the bias errors in the sensors used for navigation. If a sufficient number of encounters have taken place, then the bias terms can be solved. It is not necessary that at least the same number of encounters occur as the number of bias terms. If for example ten vehicles are present, but two vehicles thereof have two encounters, this provides for sufficient information for these two vehicles, to estimate their biases and therewith improve their state estimation. The information retrieved from these encounters may be exchanged with other vehicles with which said two vehicles later have encounters.

The relevant navigation information to be transferred by the first navigation device to the second navigation device may be an estimation of the position of the location of encounter by the first navigation device. If the estimation of the first navigation device is substantially bias free, this information is sufficient for the second navigation device to estimate its bias, and therewith to improve its own position estimation. If the estimation of the first navigation device is also subject to a bias, the first navigation device may transmit additional information, such as the twice integrated orientation matrix in case of a dead reckoning device based on an inertial sensor or a single integrated orientation matrix in case of a dead reckoning device using odometer signals. In this case where the estimation of the first navigation device is also biased, both the bias of the first and of the second navigation device can be estimated provided that the first and the navigation device have at least two encounters.

In other words, the first and the second navigation determine their bias factors by solving a system of equations formed using each others relevant navigation information obtained in a plurality of cases where proximity was detected.

It is noted that U.S. Pat. No. 6,801,855 provides systems and methods for complementary navigation devices with various integrated positioning functionality. In particular the navigation method includes providing a first navigation device having a triangulation positioning functionality and providing a second navigation device adapted to communicate with the first navigation device. The second navigation device includes one or more dead reckoning positioning components. The one or more dead reckoning positioning components are used in complement to the triangulation positioning functionality to determine the position when the triangulation positioning functionality is degraded. In the known systems and method the first and the second navigation device are arranged in a single vehicle (See col. 13, lines 44-51 and col. 22, lines 2-5) and therewith during operation in each others proximity.

The present invention differs from the known method in that it further includes the step of detecting whether the first and the second navigation device are in proximity of each other, and if the detection is positive then relevant navigation information is communicated. If it is detected that the first and the second navigation device are in proximity of each other it is presumed that the first and the second navigation device have the same position, and based on this presumption an accuracy with which the second navigation device estimates its own position is improved using the relevant navigation information received from the first navigation device. If no proximity is detected, the navigation information of the first navigation device is not used by the second navigation device.

The first navigation device may have a sensor that detects proximity, indicating whether the second navigation device is within proximity of the first navigation device. The proximity signal may initiate the first navigation device to transmit its relevant navigation information. A receiver in the second navigation device receives this relevant information. In this case the receiver also forms a facility for generating a proximity signal in the second navigation device, as the receiving of the information is an indication that it is within the proximity of the first navigation device. Alternatively the second navigation device may have an independent facility for providing the proximity signal, and the first may permanently broadcast its navigation information. Once proximity is detected by the facility of the second device, the latter may accept the broadcasted navigation information to be used for improvement of its own position estimation accuracy.

Preferably each navigation device has its own proximity sensor. In that case it may be verified whether each of the proximity sensors indicates proximity. This reduces the risk of a false alarm, i.e. unjustified proximity detection. Such unjustified proximity detection would result in an incorrect estimation of bias factors.

In the above-mentioned navigation system the first navigation device may use any means to estimate its own position, for example on the basis of GPS signals, or on the basis of a dead reckoning device or a combination thereof. The second navigation device is presumed to have a dead reckoning device, and uses the received relevant navigation information to determine its bias. However, it is alternatively possible that both navigation devices are provided with a dead reckoning device and that they exchange relevant navigation information with each other so that they can both estimate their biases and improve their navigation accuracy. It will be understood that apart from the first and the second also third and further navigation devices may be present that interact with each other and with the first and the second navigation device in a way similar to the way that the first and the second navigation device interact.

According to a third aspect a navigation device is provided comprising a dead-reckoning facility for determining an initial estimation of its own position and other relevant navigation information, a facility for providing a proximity signal that indicates whether the navigation device encounters another navigation device, a facility for receiving relevant navigation information transmitted by another navigation device, said relevant navigation information of said other navigation device comprising at least an estimation of the position of the location of encounter by said other navigation device, a facility for improving an accuracy of estimating its own position using one or more sets of received navigation information, including initial position estimations, for positions for which the proximity signal was given.

It is favorable that the relevant navigation information such as initial position estimations is not only provided unilaterally. Accordingly, in an embodiment the navigation device further comprises a facility for transmitting its initial position estimation and other relevant navigation information, so that the navigation device can also help other navigation devices to improve their position estimation. This also improves the reliability of the initial position estimations that the other navigation devices provide to the navigation device.

The invention is in particularly suitable for use in vehicle. The vehicle is for example a bicycle, car, motorcycle, train, ship, boat, or aircraft. Preferably the vehicle comprises a drive and steering mechanism controlled by the navigation device. The vehicle may comprise a further navigation facility such as a GPS receiver, or an odometer, for providing information relating to a state of the vehicle. A combination facility may be present for combining the object-state signal of the navigation device with the information provided by the further navigation facility. The combination facility may for example select the most reliable information for navigation.

In an embodiment thereof, the vehicle further comprises a drive and steering mechanism that is controlled by the navigation device. The vehicles may operate in a group that comprises at least a first vehicle with the navigation device and a second vehicle with the similar navigation device. Each time that the vehicles encounter each other, their navigation devices generate a proximity signal. The proximity signal indicates that a new combination of first and second estimations of the respective coordinate systems of the vehicles can be used to improve the estimation of the state of their respective coordinate systems. The estimation can be improved for example by determining an average value of the estimated positions, but can also be used more structurally to determine bias components of the navigation devices, which also results in an improved estimation of the states of the coordinate systems.

If the vehicles operate in a relatively small space no particular measures are necessary to guarantee that the vehicles encounter each other relatively often. In an embodiment the vehicles further comprise a controller that forces regular encounters between the vehicles. In this way also in larger environments it can be assured that encounters between vehicles occur with a sufficiently high frequency to enable a desired level of improvement of the navigation accuracy.

In a further embodiment at least the navigation device comprises a memory for storing relevant navigation information for previous detections of proximity, and the navigation device is arranged to communicate the stored relevant navigation information to a further similar navigation device when it is in proximity of the further similar navigation device. The further similar navigation device can use this communicated information to further improve its performance. The stored relevant navigation information comprises the relevant navigation information obtained by the navigation device itself and the navigation information received from similar devices which it encountered. Alternatively the navigation device may broadcast the relevant navigation information to any other navigation device, regardless its distance to the navigation device. However, if the similar navigation device stores the relevant navigation information and transmits this information once it is in proximity of the further similar navigation device, then the navigation devices do not need long range communication facilities, which is favorable for low power consumption. Two navigation devices may even exchange their navigation information indirectly, for example a first and a second navigation device may have navigation information resulting from an encounter with each other. If one of them encounters a third navigation device it may transfer this information to the third navigation device, and this third navigation device may on its turn transfer this information together with collected information of other encounters to a fourth navigation during an encounter therewith.

It is not necessary that the navigation device is part of a vehicle. It may alternatively be used as a standalone device. For example firemen may carry the device to navigate within a building obscured by smoke.

It should be noted that the signal processing functions by the navigation device can be implemented in hardware, software, or a combination of both.

BRIEF DESCRIPTION OF THE DRAWINGS

These and other aspects are described in more detail with reference to the drawing. Therein.

DETAILED DESCRIPTION OF EMBODIMENTS

Figure 1:
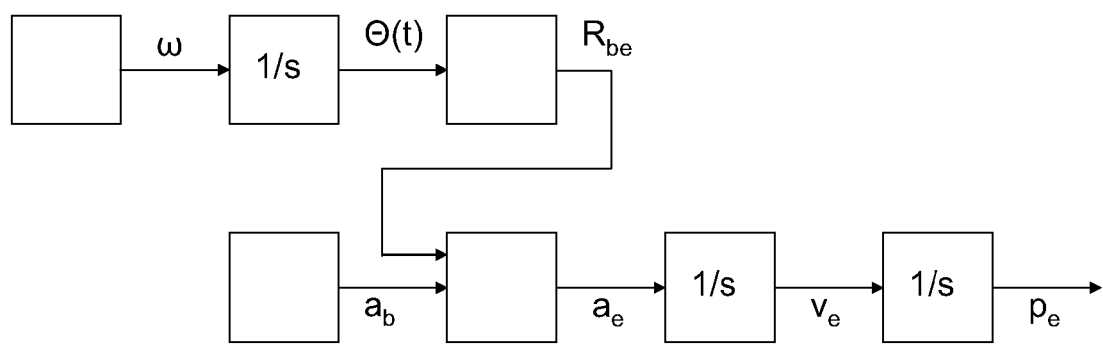
FIG. 1 shows a first embodiment of a dead-reckoning navigation module.

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, and/or sections, these elements, components, and/or sections should not be limited by these terms. These terms are only used to distinguish one element, component or section from another element, component, and/or section. Thus, a first element, component, and/or section discussed below could be termed a second element, component, and/or section without departing from the teachings of the present invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All publications, patent applications, patents, and other references mentioned herein are incorporated by reference in their entirety. In case of conflict, the present specification, including definitions, will control. In addition, the materials, methods, and examples are illustrative only and not intended to be limiting.

FIG. 1 schematically indicates the relation between signals occurring in a dead reckoning navigation device using inertial measurements. First, the measured angular velocity $\bar{\omega}$ is numerically integrated yielding the orientation of the vehicle body $\theta$. The orientation $\theta$ is used to calculate a so-called rotation matrix $R_{be}$ (usually this integration is done such that it yields directly $R_{be}$). With this matrix, the acceleration vector $\bar{a}_b$, measured with respect to the vehicle body frame axis (indicated with a subscript b), is rotated to an inertial frame. The inertial acceleration vector $\bar{a}_e$ (indicated by a subscript e) is now numerically integrated twice to obtain the velocity $\bar{v}_e$ of the body and the position $\bar{p}_e$, both with respect to an inertial frame. Provided that the initial state, i.e. velocity, position and orientation of a vehicle or person carrying the navigation device is known, it is potentially possible to determine the state at any later point in time. However, in practice the measured acceleration is biased. Accordingly this will result in a drift of the measured position and velocity relative to the real values.

Figure 2:
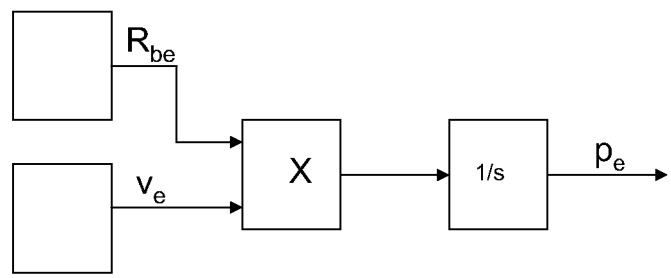
FIG. 2 shows a second embodiment of a dead-reckoning navigation module.

FIG. 2 shows another example of a dead-reckoning navigation device, wherein the velocity of the vehicle is determined by an odometer, and the orientation of the vehicle is determined by a compass. In this only one integration step is necessary to determine the position. Also in this case a bias error may be present, e.g. by a slipping of a wheel from which the odometer estimates the speed, which will result in a drift of the estimated position from the real position. Other navigation devices may determine a position by measuring a step-count of a person carrying the navigation device. Also here a bias error may be present.

According to the present invention a cooperative dead-reckoning navigation system is provided comprising dead-reckoning navigation devices that are capable to cooperate with each other. In other words the navigation devices in the navigation system carry out a cooperative navigation method. To that end at least one first dead-reckoning navigation device comprised in the dead-reckoning navigation system communicates its estimation of its position to at least one second navigation device in the navigation system. The second navigation device now has a pair of independent estimations for substantially the same position when the navigation devices encounter each other. From this pair of estimations the second navigation device may calculate an improved estimation of its position, e.g. by averaging the estimations of the pair. Moreover, from each pair of estimations an equation can be formed. If sufficient equations are formed a plurality of bias errors can be determined, therewith improving further estimates.

The wording "encounter" means that the navigation devices or persons or vehicles carrying the navigation devices are within proximity of each other. Two navigation devices are considered to be in each others proximity if they are within a predetermined range with respect to each other. The predetermined range depends on the required accuracy and on the practical means that are used to detect the encounter. For example the predetermined range may coincide with the detection range of an RFID detector. The predetermined range may for example be a sphere having a predetermined radius. Any object within that sphere will be considered as being within the predetermined range. Said predetermined radius may for example be in the order of 50 cm to 10 meter. With a substantially smaller radius, e.g. 10 cm, the probability that two vehicles spontaneously encounter each other is relatively small. Therewith also the amount of information that can be exchanged and that can be used to improve the estimation accuracy is small. However, in case that deliberate encounters between the vehicles are arranged, this is not a problem. In that case the detection radius may be relatively small if desired. If the radius is much larger than 10 m, e.g. 50 m, the accuracy improvement is relatively small. Also situations are possible wherein a substantially larger radius may be acceptable. A submarine vessel having an accuracy of 1%, will have a navigation error of 1 km after a travelled distance of 100 km. In that case an encounter with another submarine vessel also having a navigation device at a distance of 100 m may still be considered as proximate. It is true that an error is made by assuming that the navigation devices of the two encountering submarine vessels are at the same position, and consequently this error will also cause an error in the estimation of the bias factors of the navigation systems. However, as the error (100 m) made in this assumption is substantially smaller than the practically occurring navigation errors (1 km), still a more accurate estimation of the bias factors is obtained, therewith improving navigation accuracy. Likewise, navigating robots in a building may have a navigation error incrementing to tens of meters. In that case a distance of some meters may be considered proximate. It is sufficient that the navigation device has some binary decision facility that determines whether an other navigation system is proximate or not and, if the other navigation device is considered proximate, then it is assumed that the positions estimated by the encountering navigation devices are estimations for the same position, and the navigation information of the other navigation device is used, if the other navigation device is not considered proximate, the navigation information of the other navigation device is not used. (Although earlier stored navigation relating to earlier encounters stored by the other navigation device may be used.)

A unidirectional transmission of navigation information allows the second navigation device to improve its navigation accuracy. The first navigation device may also improve its navigation accuracy if it receives navigation information from the second navigation device. However, alternatively it may improve its navigation accuracy by receiving a result obtained by the second navigation device. For example the second navigation device may estimate the bias error of the first navigation device and transmit this estimation to the first navigation device.

Preferably a navigation device only transmits its navigation information at positions where an encounter with another navigation device has taken place. It is possible to transmit navigation information more frequently but this would result in increased power consumption.

Figure 3:
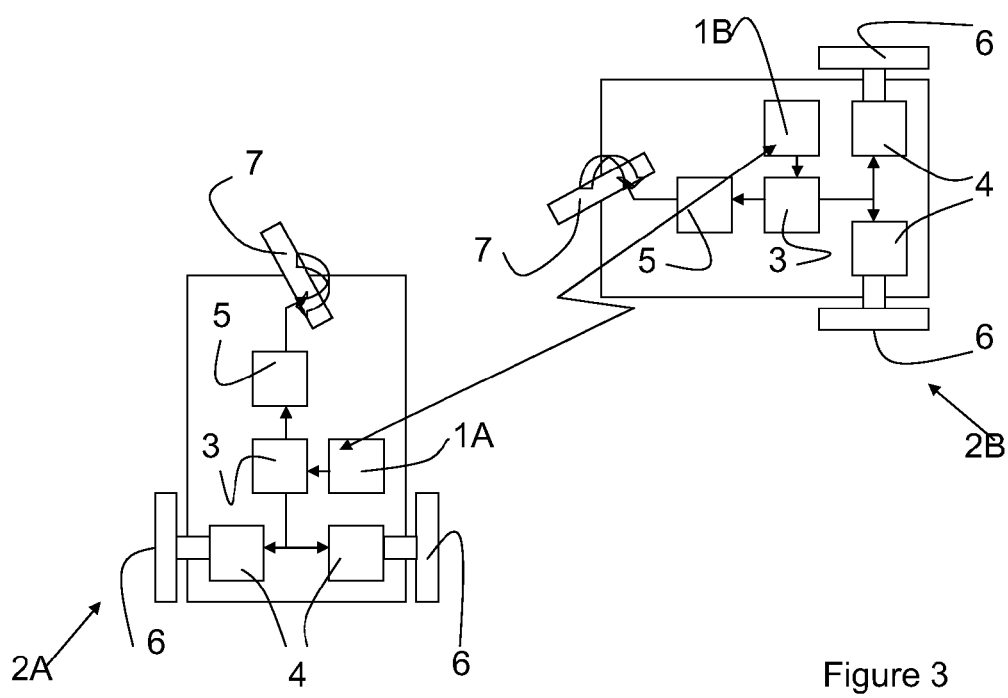
FIG. 3 shows a pair of vehicles having mutually cooperating navigation devices.

FIG. 3 shows a group of vehicles. For clarity only a first 2A and a second vehicle 2B are shown. Each of the vehicles 2A, 2B comprises a navigation device 1A, 1B respectively, as well as a drive mechanism 4 and steering mechanism 5 controlled by the navigation device 1, via a control unit 3. The control unit 3 uses navigation information retrieved from the navigation device 1 to control a driving speed with which the drive mechanism 4 drives back-wheels 6 and to control an orientation imposed by the steering mechanism 5 on the front wheel 7.

Figure 4:
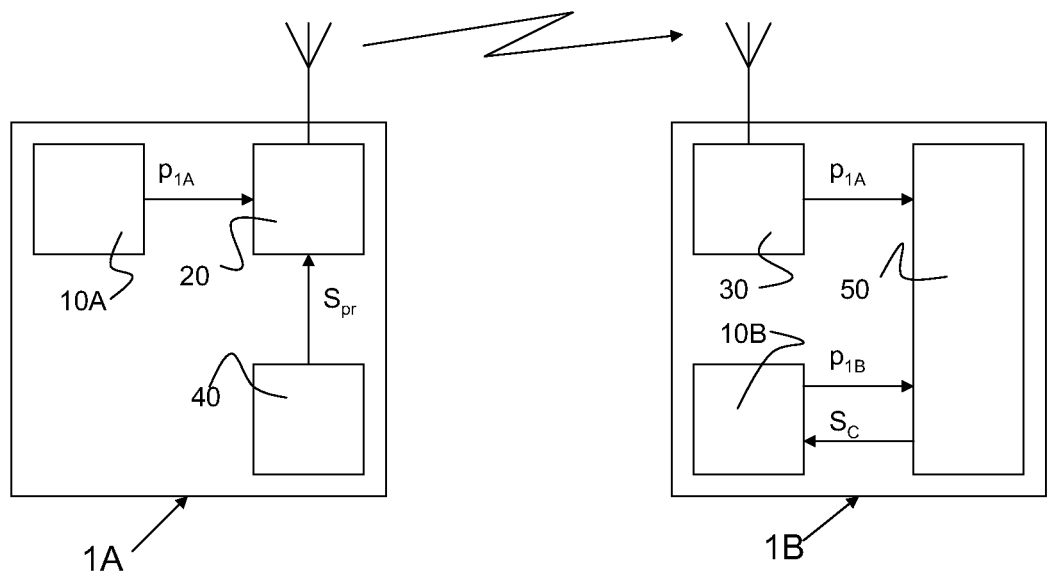
FIG. 4 shows a first embodiment of a navigation system according to the invention.

FIG. 4 shows in more detail an embodiment of the navigation devices 1A, 1B. The navigation devices 1A, 1B form a first and a second navigation device of a navigation system. The navigation system may comprise further navigation devices in addition to 1A and 1B. Each of the navigation devices 1A, 1B is capable of determining an initial estimation of its own position. In the embodiment shown the first navigation device 1A has a navigation module 10A that provides estimation $P_{1A}$. Second navigation device 1B has a navigation module 10B that provides estimation $P_{1B}$. In the navigation system the first navigation device 1A has a facility 20 for transmitting relevant navigation information "Info" to the second navigation device 1B. Dependent on the type of navigation modules 10A of device 1A, the transmitted relevant navigation information Info may include the estimation $P_{1A}$, but may also include other navigation information. The second navigation device 1B has a facility 30 for receiving the transmitted "Info". At least one of the navigation devices, here the first navigation device 1A has a facility 40 for providing a proximity signal $S_{pr}$, that indicates whether the navigation devices 1A, 1B are within proximity of each other. The navigation module 10B of the second navigation device 1B has a dead reckoning facility for calculating the initial estimation $P_{1B}$ of its position and a facility 50 for improving an accuracy of estimating its own position using the transmitted relevant navigation information Info provided by the first navigation device 1A for positions for which the proximity signal was given. This is symbolically illustrated by correction signal $S_C$. In the sequel, the method for improving the accuracy will be described in more detail.

In the embodiment shown in FIG. 4 it is not relevant how the navigation module 10A of the first navigation device 1A calculates the initial estimation $P_{1A}$ for its position. Dependent on the nature of the navigation device 1A, the transmitted relevant navigation information "Info" may for example only comprise the initial estimation $P_{1A}$ of the location of encounter as relevant navigation information. This is the case if the navigation module 10A is GPS based. If alternatively the navigation module 10A of the first navigation device 1A is also a dead-reckoning facility, it may transmit further relevant navigation information. The further relevant navigation information may comprise a double integrated rotation matrix if the navigation module is dead reckoning facility based on inertial sensor readings, or a single integrated rotation matrix if it is based on odometer readings. This additional relevant navigation information assists the second navigation device 1B to estimate the bias of the first navigation module 10A, and therewith to improve the estimation of its own bias. Examples of a dead-reckoning facility were described with reference to FIGS. 1 and 2.

In the embodiment of FIG. 4, the navigation device 1A is an altruistic device in that it merely transmits its own navigation information, without using information of others. Navigation device 1B on the other hand merely uses position estimation information used by others.

Figure 5:
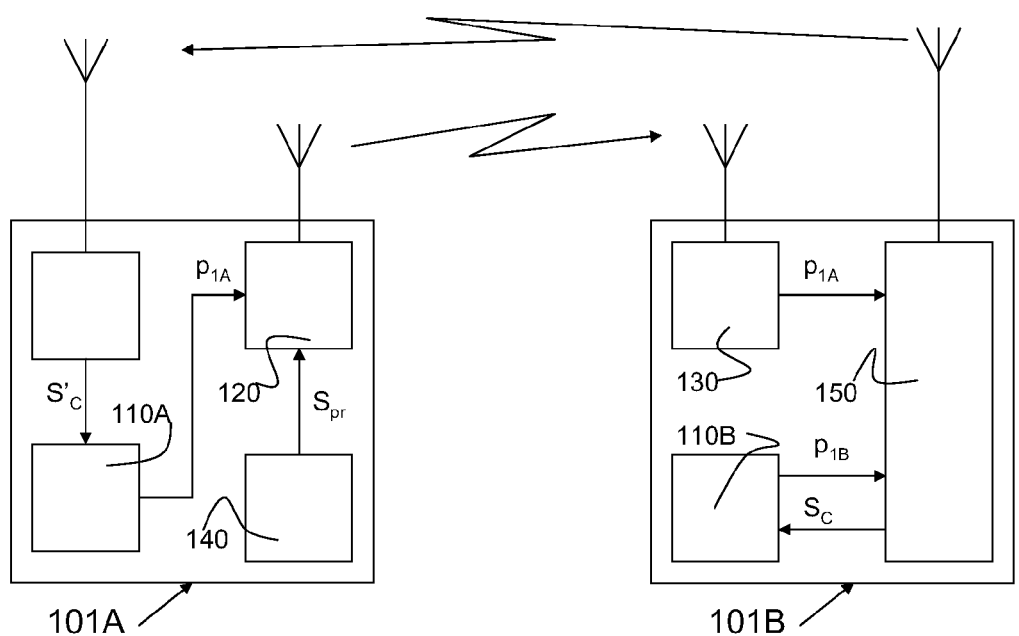
FIG. 5 shows a second embodiment of a navigation system according to the invention.

FIG. 5 shows a further embodiment. Parts therein corresponding to those in FIG. 4 have a reference number that is 100 higher. Contrary to the previous embodiment, the second navigation device 1B transmits a correction signal $S'_c$ to the navigation module 110A of navigation device 101A that also enables the first navigation device 101A to improve its accuracy of the estimation of its position.

Figure 6:
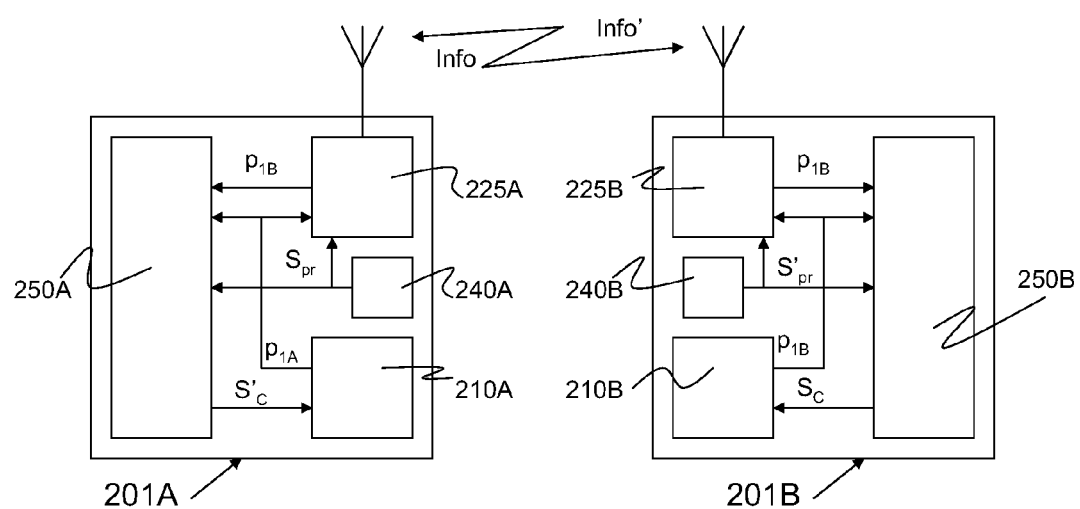
FIG. 6 shows a third embodiment of a navigation system according to the invention.

FIG. 6 shows a still further embodiment with a further pair of navigation devices 1A and 1B. Parts therein corresponding to those in FIG. 4 have a reference number that is 200 higher and additionally a suffix A for parts of device 1A and a suffix B for parts of device 1B. In the embodiment shown in FIG. 6 each of the navigation devices 201A, 201B transmits its estimated position $P_{1A}$, $P_{1B}$ and other relevant navigation information, if applicable, as relevant navigation information "Info, Info'" to the other one using bidirectional transmission facility 225A, 225B. If further navigation devices are present then the navigation devices 201A, 201B may also transmit their relevant navigation information to those other devices. Alternatively, the navigation devices may only use short distance transmission, so that they only exchange information when they encounter each other.

Furthermore, each of the navigation devices 201A, 201B has its own proximity detector 240A, 240B that provide proximity detection signals $S_{pr}$ and $S'_{pr}$ respectively. In an embodiment the navigation devices 201A, 201B may transmit each other these proximity detection signals $S_{pr}$ and $S'_{pr}$ and generate an improved proximity detection signals $S''_{pr}$ by combining the signals in an AND-gate. In that way the risk of false detections is minimized.

A way in which the exchanged position information can be used to improve the accuracy of position estimation is now described in more detail with reference to FIGS. 7-11.

It is assumed that there are several users/vehicles V1, V2, V3 (FIG. 7) etc. travelling in an inertial space. Each of these users is equipped with a strap-down inertial navigation device. The errors on attitude measurement are assumed to be negligible. Regularly vehicles trajectories cross and vehicles encounter each other at crossing points C1, C2, C3. The encounter itself is detected by the vehicles by some device (for instance a short range radio communication device). At the moment of the encounter it is assumed that the positions of both vehicles are the same.

Furthermore, in the next simplified mathematical derivation it is assumed that no other errors are present besides some bias error on the accelerometers.

In practice, numerical integration in the inertial system (INS) of each vehicle is done by summing. If errors due to this approximation of numerical integration are neglected, the reading of the INS may be evaluated as:

$$\bar{v}_e^i(T) = \int_0^T \bar{a}_e^i(t) \cdot dt, \quad \bar{p}_e^i(T) = \int_0^T \bar{v}_e^i(t) \cdot dt$$

With $\bar{a}_e^i(t)$, $\bar{v}_e^i(t)$ and $\bar{p}_e^i(t)$ the time varying acceleration vector, velocity vector and position vector in the earth reference system (subscript e), indicated by the INS (superscript i). T is the duration of the travel. $\bar{v}_e^i(T)$ and $\bar{p}_e^i(T)$ are then the INS velocity and position reading at time T.

The measured acceleration in the inertial frame is derived from the acceleration measured in the body frame using the time varying rotation matrix $R_{be}(t)$: $\bar{a}_e^i(t) = R_{be}(t) \cdot \bar{a}_b^i(t)$, with subscript b denoting the body reference system.

It then follows:

$$\bar{p}_e^i(T) = \int_{\tau=0}^{\tau=T} \int_{t=0}^{t=\tau} R_{be}(t) \cdot \bar{a}_b^i(t) \cdot dt \cdot d\tau$$

If noise and other measurement errors are neglected for now, and it is assumed that the accelerometer bias is the major error contributor, the measured acceleration may be written as the sum of the ideal (true) acceleration (superscript t) and the measurement bias, which is assumed constant:

$$\bar{a}_b^i(t) = \bar{a}_b^t(t) + \bar{b}$$

For the position indication of the INS it then follows:

$$\bar{p}_e^i(T) = \int_{\tau=0}^{\tau=T} \int_{t=0}^{t=\tau} R_{be}(t) \cdot (\bar{a}_b^t(t) + \bar{b}) \cdot dt \cdot d\tau$$

$$\bar{p}_e^i(T) = \int_{\tau=0}^{\tau=T} \int_{t=0}^{t=\tau} R_{be}(t) \cdot \bar{a}_b^t(t) \cdot dt \cdot d\tau + \bar{b} \int_{\tau=0}^{\tau=T} \int_{t=0}^{t=\tau} R_{be}(t) \cdot dt \cdot d\tau$$

The right side of the last expression contains two terms. The first term is the evaluation of the true position of the object. In the second term, the bias is placed outside the integrand since it is assumed constant. The integrand of the second term is known at the end of the integration time T and is derived from the gyro measurements. Double integration of the integrand results in a known constant matrix $\theta(T)$. The equation for the position indication of the INS at time T can now be further simplified to:

$$\bar{p}_e^i(T) = \bar{p}_e^t(T) + \bar{b} \cdot \theta(T)$$

Now suppose multiple vehicles are traversing an inertial space. Each vehicle has its own INS. Occasionally vehicles may cross trajectories and encounter each other. Each vehicle has its unique identification number and each crossing point is also given a unique number (1, 2, 3, etc.). An example situation is given in FIG. 7.

Figure 7:
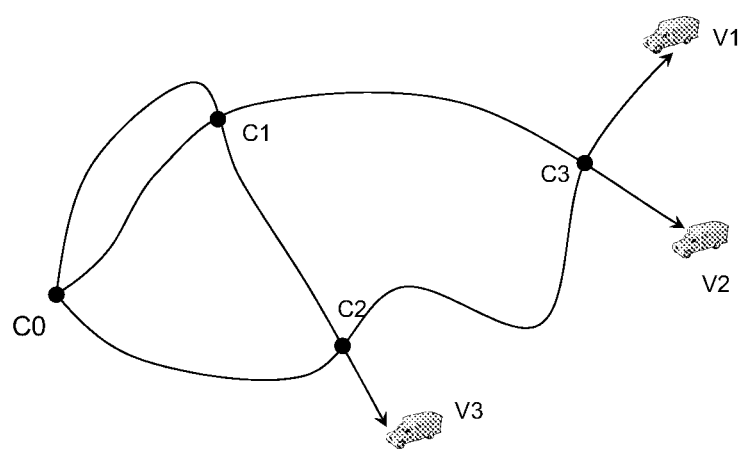
FIG. 7 shows an example of vehicles having mutually crossing trajectories.

FIG. 7 shows a plurality of vehicles V1, V2, V3 each comprising a navigation device that traverse an inertial space. Occasionally, vehicles cross trajectories and encounter each other. They exchange information and at a later time they can use the information to estimate their sensor errors.

In the figure, crossing points (C0, C1, C2, C3) are indicated by a dot and the trajectories by a line. By way of example, all vehicles V1, V2, V3 start their trajectory in the origin (=crossing point C0). The time of arrival of a vehicle at a crossing point with number j is denoted by Tj. Lets assume all time varying variables are evaluated at time Tj and we use a superscript j to denote this. Now the general expression for the position indicated by the INS of vehicle Vk is:

$$\bar{p}_{e,k}^{i,j} = \bar{p}_{e,k}^{t,j} + \bar{b}_k \cdot \theta_k^j = \bar{m}_k^j$$

In this expression subscript k stands for the vehicle number and j stands for the j-th crossing point. So, $\bar{p}_{e,k}^{i,j}$ stands for the position indication of the INS of vehicle k at crossing point j and is further abbreviated to $\bar{m}_k^j$. Likewise, $\theta_k^j$ stands for the evaluation of $\theta(T)$ of vehicle k at the arrival time in crossing point j.

It is assumed that all vehicles V1, V2, V3 have an encounter detection facility that can detect the encounter (for example a simple radio device with limited transmission range). There may even be a strategy that the vehicles deliberately try to encounter in order to increase their navigation accuracy. Furthermore it is assumed that the vehicles can exchange information with each other.

Two encountering vehicles (for instance with numbers k1 and k2) exchange information about their $\theta_k^j$ and $\bar{m}_k^j$ as the relevant navigation information Info, Info'. They also exchange information about $\theta_k^j$ and $\bar{m}_k^j$ of all their previous encounters with other vehicles. Using all this information a vehicle can set-up a set of equations:

$$\left.\begin{array}{l} \bar{m}_{k1}^{j1} = \bar{p}_{e,k1}^{t,j1} + \bar{b}_{k1} \cdot \theta_{k1}^{j1} \\ \bar{m}_{k2}^{j1} = \bar{p}_{e,k2}^{t,j1} + \bar{b}_{k2} \cdot \theta_{k2}^{j1} \\ \bar{m}_{k3}^{j2} = \bar{p}_{e,k3}^{t,j2} + \bar{b}_{k3} \cdot \theta_{k3}^{j2} \\ \ldots \end{array}\right\}$$

Since the number of encounters grows unlimited (theoretically), the number of available equations also does. Now, all two equations involving the same crossing point are subtracted from each other. Obviously, $\bar{p}_{e,k1}^{t,j} = \bar{p}_{e,k2}^{t,j}$ for all j and they disappear from the resulting set of equations:

$$\left.\begin{array}{l} \bar{m}_{k1}^{j1} - \bar{m}_{k2}^{j1} = \bar{b}_{k1} \cdot \theta_{k1}^{j1} - \bar{b}_{k2} \cdot \theta_{k2}^{j1} \\ \bar{m}_{k1}^{j2} - \bar{m}_{k3}^{j2} = \bar{b}_{k1} \cdot \theta_{k1}^{j2} - \bar{b}_{k3} \cdot \theta_{k3}^{j2} \\ \bar{m}_{k2}^{j3} - \bar{m}_{k3}^{j3} = \bar{b}_{k2} \cdot \theta_{k2}^{j3} - \bar{b}_{k3} \cdot \theta_{k3}^{j3} \\ \ldots \end{array}\right\}$$

The number of equations depends on the number of encounters between a limited set of vehicles. The number of unknowns (i.e. the biases) is limited and is equal to the number of vehicles. So, after some time, the number of equations may become equal or larger than the number of unknowns and the set of equations can be solved if the equations are independent of each other. The equations obtained are independent if the vehicles move independently and their trajectories are "complex" (i.e. several changes of directions and velocity changes).

In the case illustrated and described with reference to FIG. 4 only the first navigation device 1A transmits position information $P_{1A}$ corresponding to $\overline{m_A{}^j}$ in the equations above. If the navigation device 1A has a GPS-based navigation module 10A, then the data $\theta_A{}^j$ does not exist. In that case 1B only has to solve the equation.

$\overline{p_A{}^j} - \overline{p_B{}^j} = -\overline{b_B} \cdot \theta_B{}^j$, and the relevant navigation information "Info" to be transmitted by navigation device 1A is the position $\overline{p_A{}^j}$ only.

To illustrate the mathematical principle, the example in FIG. 7 is taken. The resulting set of equations for this example would be:

$$\left. \begin{array}{l} \overline{m}_2^1 - \overline{m}_3^1 = \overline{b}_2 \cdot \theta_2^1 - \overline{b}_3 \cdot \theta_3^1 \\ \overline{m}_1^2 - \overline{m}_3^2 = \overline{b}_1 \cdot \theta_1^2 - \overline{b}_3 \cdot \theta_3^2 \\ \overline{m}_1^3 - \overline{m}_2^3 = \overline{b}_1 \cdot \theta_1^3 - \overline{b}_2 \cdot \theta_2^3 \end{array} \right\}$$

Two simulations were carried out to verify correct operation of the present invention.

One simulation involves three vehicles running "random" trajectories and having a total of three crossing points.

This simulation resembles the scenario as depicted in FIG. 7 above. A second simulation involves two vehicles in a so-called "satellite patrol" scenario, having two crossing points. First the Random" trajectory simulation is described. The simulation has been set-up as follows. For three vehicles, "random" trajectories are created, plotted in FIG. 8 for the x-y plane. First, a set of waypoints is defined for each vehicle. These waypoints are indicated by a star in FIG. 8. The first waypoint of all three trajectories is the origin at coordinates (0,0). A polynomial trajectory is fitted on the waypoints such that the trajectory exactly passes through the waypoints. These polynomial trajectories are indicated with solid lines in the figure. An extra "hidden" waypoint is used at the origin making the derivative of the polynomial zero at the origin (this corresponds with starting the trajectory with zero velocity). The result is a set of three polynomials describing the three trajectories as a function of time. From these polynomials, the time derivative polynomials and double time derivative polynomials are derived, corresponding with the exact velocity and acceleration of the three vehicles as a function of time. This results in three sets of three polynomials each, describing the vehicle position, velocity and acceleration as a function of time. All polynomials have been evaluated at discrete time instances (i.e., they are sampled). From the sampled velocity, the exact sampled vehicle attitude (heading) is derived:

$\theta = \text{atan } 2(v_y, v_x)$, wherein atan 2(*) is the four quadrant arctangent function. From the exact acceleration and attitude, the exact acceleration in the body axis system is derived.

The attitude and body axis acceleration calculated in this way is used to simulate an INS system. In the simulation discussed here, a simple INS is used involving straightforward integration using Euler integration steps. Alternatively however a more exact integration method may be used.

Figure 8:
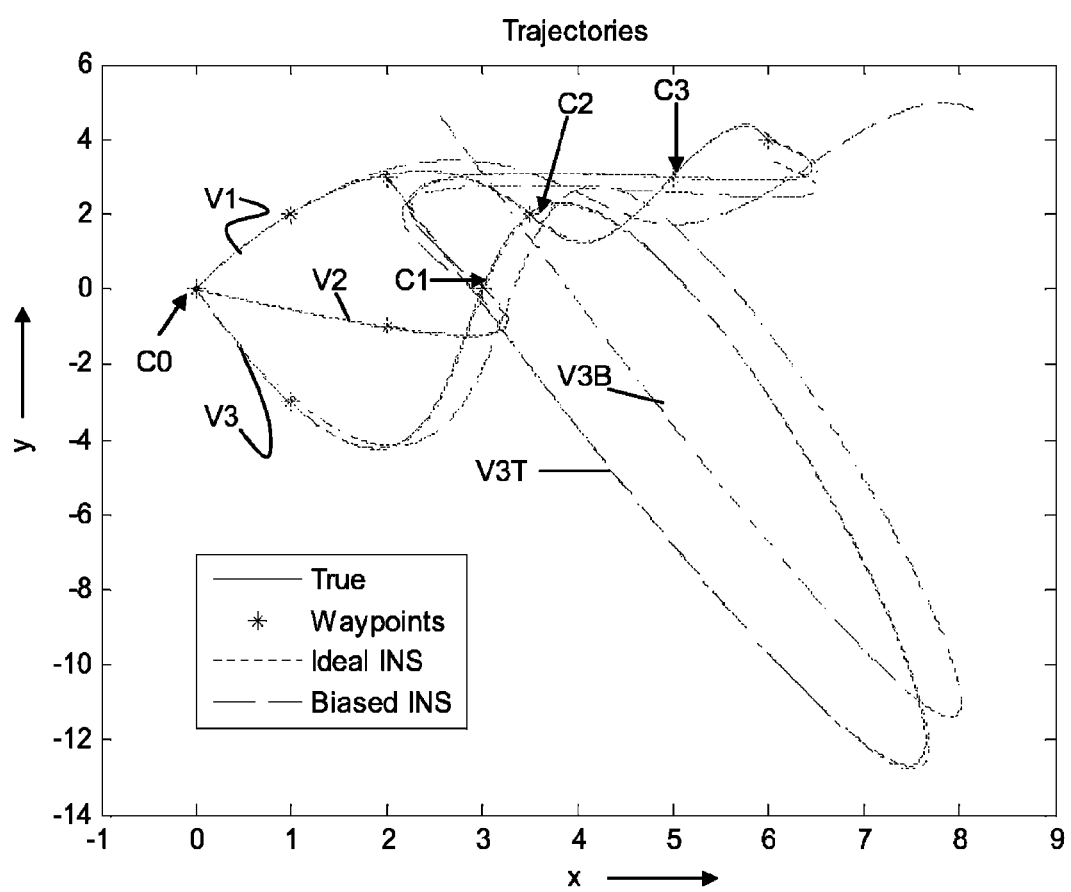
FIG. 8 shows trajectories for a plurality of vehicles, as well as paths determined by biased estimators in a first simulation, FIG. 9 compares the simulated biases with the bias as estimated with a method according to the present invention.

The result of this simple INS (i.e., the vehicle trajectories) is indicated in FIG. 8 with dotted lines. As can be seen the INS trajectories coincide substantially with the ideal polynomial trajectories. The small differences are the result of numerical integration errors and can be made arbitrarily small by making the time steps smaller. Furthermore, a measured body acceleration was simulated by adding bias terms to the true body acceleration. Numerical integrating again, this results in the erroneous INS trajectory indication, plotted in FIG. 8 with dashed lines. By way of example FIG. 8 shows the true trajectories V3T of vehicle V3 as well as the trajectory V3B that is estimated based upon the biased measurements.

As can be seen from FIG. 8, the trajectories for vehicles V2 and V3 cross each other at the crossing point. numbered C1 in the figure. The trajectories for vehicles V1 and V3 cross each other at crossing point C2. The trajectories for vehicles V1 and V2 cross each other at crossing point C3. At the crossing points, the true vehicle locations are identical. The INS position indications of the respective vehicles obviously are not the same (indicated by the dashed lines in the figure).

Information about crossing point C1 is stored in the memory of vehicles V2, V3. At crossing point C2, information about crossing point C1 is communicated to vehicle V1 by vehicle V3. Furthermore, information about crossing point C2 is stored in the memory of vehicles V1, V3. At crossing point C3, all information about the previous crossing points C1, C2 is available to vehicles V1, V2 and the biases of all three vehicles V1, V2, V3 can be solved.

To illustrate this communication process, the memory content of all three vehicles V1, V2, V3 at the three successive crossing points C1, C2, C3 is given in the following Table. The numbers indicate the crossing point about which information is available.

|  | Vehicle V1 | Vehicle V2 | Vehicle V3 |
| --- | --- | --- | --- |
| C0 (origin) | Empty | Empty | Empty |
| C1 | Empty | 1 | 1 |
| C2 | 1, 2 | 1 | 1, 2 |
| C3 | 1, 2, 3 | 1, 2, 3 | 1, 2 |

At crossing point C3, enough information is available to vehicles V1, V2 and the biases can be solved.

Figure 9:
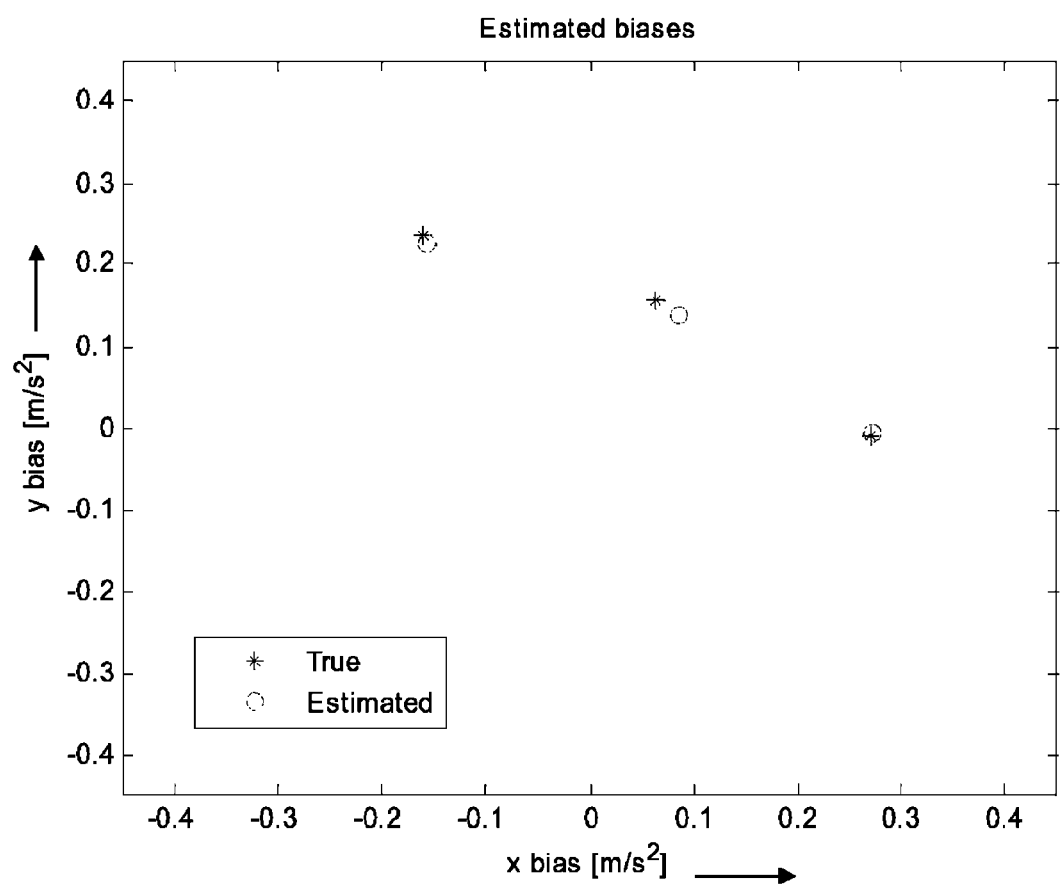
Figures 10, 11:
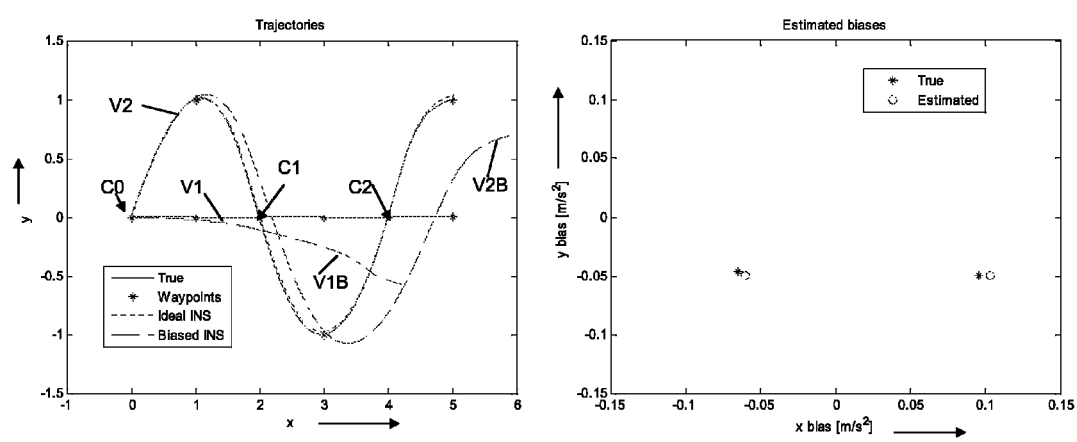
FIG. 10 shows trajectories of simulated vehicles in a second simulation, FIG. 11 compares the simulated biases with the bias as estimated with a method according to the present invention in this second simulation.

FIG. 9 shows the true (random selected) biases and the estimated biases. Each star indicates the true (x,y) bias values of a vehicle. Each circle indicates the estimated (x,y) bias values of a vehicle. As can be seen, the bias estimation is not perfect. This is primarily due, however, to the imperfect INS-model used.

In this embodiment it is presumed that the vehicles only exchange information with another vehicle that they encounter. Accordingly, in this embodiment, although the bias of vehicle V3 can be calculated at the third crossing point C3 by vehicles V1, V2, this information is not available to vehicle V3. Alternatively, however, the vehicles may use long distance communication, so that they always have the same information about previous crossing points available.

In a second simulation, denoted as "Satellite patrol" trajectory simulation, only two vehicles are involved. The simulation set-up is the same as in the previous paragraph. The first vehicle V1 runs a more or less straight trajectory indicated by a first solid line in FIG. 10. A second vehicle V2 follows a trajectory that "orbits" about the trajectory of the first vehicle V1 and is indicated by a second solid line in FIG. 10.

The (ideal) INS position indications for both vehicles are represented by the dotted lines. These coincide substantially with the true trajectories. The biased, INS-position indications V1B, V2B are represented by the dashed line and have strong deviations from the true trajectories. Besides the origin C0, both vehicles have two crossing points C1, C2. At the second crossing point, two equations can be set-up and two sets of biases can be estimated. The results are presented in FIG. 11. Therein the stars indicate the true x- and y-values of the sensor biases. The red circles indicate the estimated x- and y-values of the sensor biases. The imperfect estimation is primarily due to INS integration errors.

Figure 12:
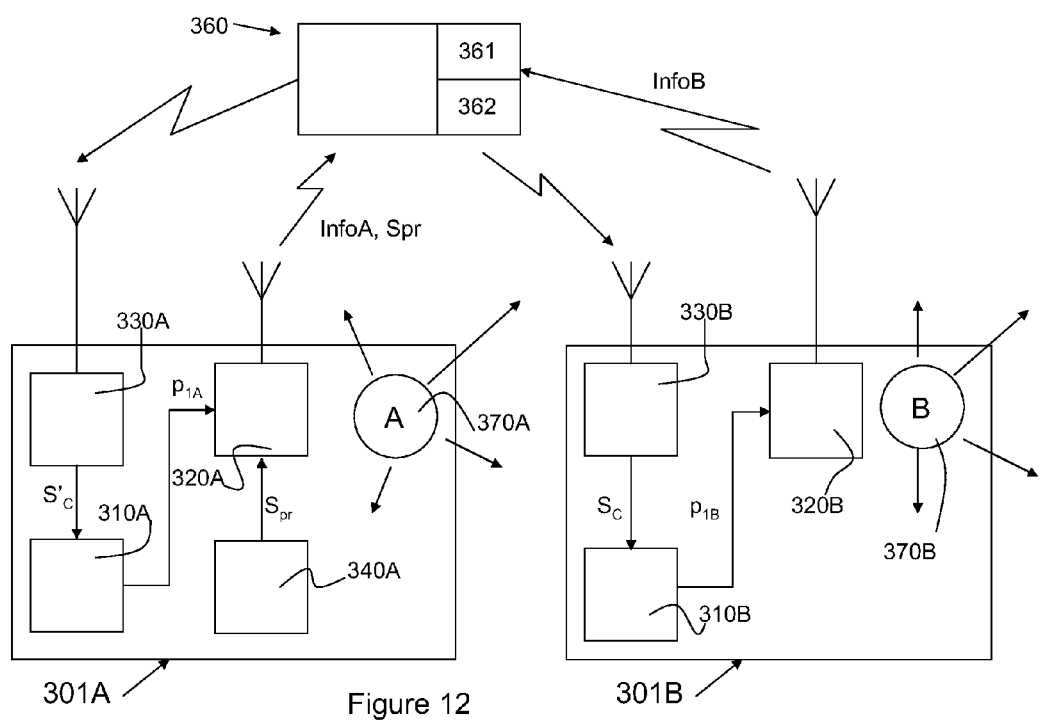
FIG. 12 shows a fourth embodiment of a navigation system according to the invention.

It is not necessary that a navigation system itself performs itself the calculations for improving its accuracy. FIG. 12 shows a fourth embodiment of a navigation system according to the invention. Parts therein corresponding to those in FIG. 4 have a reference number that is 300 higher and additionally a suffix A for parts of device 1A and a suffix B for parts of device 1B. In the embodiment shown in FIG. 6 each of the navigation devices 201A, 201B The navigation system comprises at least a first and a second navigation device 301A, 301B that are arranged to be moved independently of each other and that each are capable of determining an initial estimation $P_{1A}$, $P_{1B}$ of their own position. In addition the navigation system comprises a central server 360. This embodiment of the navigation system is particularly useful if it is desired to centrally track the positions of the navigation devices. In this embodiment the first and the second navigation device 301A, 301B have a facility for transmitting relevant navigation information InfoA, InfoB to the central server 360. The relevant navigation information comprises at least an estimation of the position of the location of encounter $P_{1A}$, $P_{1B}$ by the first navigation device and by the second navigation device. In addition the navigation devices 301A, 301B transmit information about their identity to the central server 360.

The central server 360 has a facility for receiving the transmitted relevant navigation information InfoA, InfoB (361) and the information about identity.

The first navigation device has a facility 340 for providing a proximity signal Spr that indicates whether the first and second navigation device 301A, 301B encounter each other. The first navigation device 340 transmits this information to the central server 360.

The first and the second navigation device 301A, 301B each have a dead reckoning facility 310A, 310B for calculating the initial estimation $P_{1A}$, $P_{1B}$ of their position and the central server 360 has a facility 362 for improving an accuracy with which the navigation devices estimate their position using the relevant navigation information transmitted by the navigation devices 301A, 301B for positions for which the proximity signal Spr was given.

In a simple embodiment the central server 360 may upon receipt of the proximity signal Spr calculate an average value of the initial estimations $P_{1A}$, $P_{1B}$ for the position of the navigation devices for which a proximity was detected. In case that the system only comprises two navigation devices it suffices to submit the calculated average value as an improved position estimation to both navigation devices 301A, 301B. If the navigation system comprises a larger plurality of navigation devices than only the navigation devices that are involved in the encounter should be addressed. In an embodiment the central server 360 may have information indicative for the identity of the navigation devices involved in the encounter from the proximity detector 340. In that embodiment the proximity detector does not only detect a proximity, but also detects the identity of the other navigation device that is encountered. Each navigation device 301A, 301B may for example have a short range identity transmitter 370A, 370B that transmits information about its identity. When information from a short range identity transmitter, e.g. 370B is received by the proximity detector, e.g. 340 of the other navigation device, e.g. by 301A, the fact that there is an encounter with an other navigation device, as well as the identity of the other navigation device involved in the encounter are known.

In another embodiment the navigation devices may each have a proximity detector. In that case it is sufficient if the navigation devices only transmit their own identity.

In the example described with reference to FIG. 12, the relevant navigation information to be transferred by the navigation devices to the central server is limited to an estimation of the position of the location of encounter by the navigation devices. If the estimation of the first navigation device is substantially bias free, this information is sufficient for the second navigation device to estimate its bias, and therewith to improve its own position estimation. If the estimation of the first navigation device is also subject to a bias, the first navigation device may transmit additional information, such as the twice integrated orientation matrix in case of a dead reckoning device based on an inertial sensor or a single integrated orientation matrix in case of a dead reckoning device using odometer signals. In this case where the estimation of the first navigation device is also biased, both the bias of the first and of the second navigation can be estimated provided that the first and the navigation device have at least two encounters.

In other words, the central server determine the bias factors of the first and the second navigation devices by solving a system of equations formed using each others relevant navigation information obtained in a plurality of cases where proximity was detected.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention claimed is:

1. Method of cooperative navigation, comprising the steps of
  a. providing at least a first and a second navigation device, each having at least a navigation sensor, for providing navigation data indicative of a movement state of the navigation sensor, and transmitting navigation data,
  b. independently moving the first and the second navigation device in a shared environment,
  c. detecting whether the first and the second navigation device encounter each other, and transmitting a proximity signal indicative for an encounter of the first and the second navigation device,
  d. at least estimating a position of the second navigation device using a dead-reckoning method, and if the proximity signal indicates an encounter improving an accuracy of said estimation using navigation information from the first navigation device with the assumption that the first and the second navigation device are at the same position.

2. Method of cooperative navigation, comprising the steps of
   a. providing a central server and at least a first and a second navigation device, each of the navigation devices having at least a navigation sensor, for providing navigation data indicative of a movement state of the navigation sensor, and transmitting said navigation data to the central server,
   b. independently moving the first and the second navigation device in a shared environment,
   c. detecting whether the first and the second navigation device encounter each other, and transmitting to the central server a proximity signal indicative for an encounter of the first and the second navigation device,
   d. at least estimating a position of the second navigation device using a dead-reckoning method, and if the proximity signal indicates an encounter improving an accuracy of said estimation using navigation information from the first navigation device with the assumption that the first and the second navigation device are at the same position.

3. Method of cooperative navigation, comprising the steps of
   a. providing at least a first and a second navigation device, at least the second navigation device being capable of estimating its own position using a dead-reckoning method,
   b. independently moving the first and the second navigation device in a shared environment,
   c. detecting whether the first and the second navigation device encounter each other,
   d. if the detection is positive communicating relevant navigation information obtained by the first navigation device at the moment of said detection to the second navigation device, said relevant navigation information comprising at least an estimation of the position of the location of encounter by the first navigation device,
   e. improving an accuracy with which the second navigation device estimates its own position using the relevant navigation information received from the first navigation device with the assumption that the first and the second navigation device are at the same position.

4. Method according to claim 3, wherein the first and the second navigation device exchange relevant navigation information with each other when an encounter between the first and the second navigation device is detected, wherein the relevant navigation information exchanged from the first navigation device to the second navigation device comprises at least an estimation of the position of the location of encounter by the first navigation device, and wherein the first and the second navigation device determine their systematic errors by solving a system of equations formed using each others relevant navigation information obtained in a plurality of cases where an encounter was detected.

5. Navigation system comprising at least a first and a second navigation device, each having at least a navigation sensor, the navigation devices each being arranged to be moved mutually independent from each other and at least the first navigation device being arranged for transmitting navigation data indicative of its state,
   the navigation system having a facility for receiving the transmitted navigation information,
   at least one of the first and second navigation device having a facility for providing a proximity signal that indicates whether the first and second navigation device encounter each other,
   the navigation system at least having a dead reckoning facility for calculating an initial estimation of a position of the second navigation device and a facility for improving an accuracy of this estimation using the navigation information transmitted by the first navigation device for positions for which the proximity signal was given with the assumption that the first and the second navigation device are at the same position.

6. Navigation system comprising at least a first and a second navigation device and a central server, the first and the second navigation device each having at least a navigation sensor, the navigation devices each being arranged to be moved mutually independent from each other and being arranged for transmitting navigation data indicative of their state to the central server,
   at least one of the first and second navigation device having a facility for transmitting a proximity signal to the central server that indicates whether the first and second navigation device encounter each other,
   the navigation system at least having a dead reckoning facility for calculating an initial estimation of a position of the second navigation device and a facility for improving an accuracy of this estimation using the navigation information transmitted by the first navigation device for positions for which the proximity signal was given with the assumption that the first and the second navigation device are at the same position.

7. Navigation system comprising at least a first and a second navigation device that are arranged to be moved mutually independent from each other and that each are capable of determining an initial estimation of their own position,
   the first navigation device having a facility for transmitting relevant navigation information to the second navigation device,
   the second navigation device having a facility for receiving the transmitted relevant navigation information,
   at least one of the first and second navigation device having a facility for providing a proximity signal that indicates whether the first and second navigation device encounter each other,
   the second navigation device having a dead reckoning facility for calculating the initial estimation of its position and a facility for improving an accuracy of estimating its own position using relevant navigation information transmitted by the first navigation device for positions for which the proximity signal was given, said relevant navigation information comprising at least an estimation of the position of the location of encounter by the first navigation device with the assumption that the first and the second navigation device are at the same position.

8. Navigation system according to claim 7, wherein the first and the second navigation device exchange relevant navigation information with each other if they detect an encounter, wherein the relevant navigation information of the second navigation device comprises at least an estimation of the position of the location of encounter by the second navigation device, and wherein the first and the second navigation device determine their systematic errors by solving a system of equations formed using each others relevant navigation information that was exchanged for a plurality of cases where an encounter was detected.

9. Navigation device comprising a dead-reckoning facility for determining an initial estimation of its own position, a facility for providing a proximity signal that indicates whether the navigation device encounters another navigation device, the navigation device and the other navigation device being arranged to be moved independently with respect to each other, a facility for receiving relevant navigation information transmitted by another navigation device, said relevant navigation information of said other navigation device comprising at least an estimation of the position of the location of encounter by said other navigation device, a facility for improving an accuracy of estimating its own position using relevant navigation information transmitted for positions for which the proximity signal was given with the assumption that the first and the second navigation device are at the same position.

10. Navigation device according to claim 9, further comprising a facility for transmitting relevant navigation information, said relevant navigation information comprising at least an estimation of the position of the location of encounter by the navigation device.

11. Navigation device according to claim 9 or 10, wherein the facility for providing a proximity signal comprises a proximity sensor.

12. Navigation device according to claim 9 or 10, wherein the facility for providing a proximity signal comprises a receiver that receives a proximity signal from said another navigation device.

13. Navigation device according to claim 11, further comprising a GPS facility and a combination facility for combining navigation information obtained from the GPS facility with navigation information determined by the dead reckoning facility.

14. Vehicle provided with a navigation device according to one of the claims 9 or 10.

15. Vehicle according to claim 14, further comprising a drive and steering mechanism controlled by the navigation device.

16. Navigation system as claimed in claim 5, 6 or 7, wherein the at least a first and a second navigation device are provided in a respective vehicle of a group of vehicles, the vehicles further comprising a respective drive and steering mechanism controlled by the navigation device.

17. Navigation system as claimed in claim 16, wherein the vehicles further comprise a controller that forces regular encounters between the vehicles.

18. Navigation system as claimed in claim 16, wherein the at least one of the navigation devices has a memory for storing relevant navigation information obtained from mutually independent navigation devices for positions at which a proximity signal was provided indicative for an encounter between said navigation devices.

* * * * *

UNITED STATES PATENT AND TRADEMARK OFFICE
CERTIFICATE OF CORRECTION

PATENT NO.        : 8,548,731 B2                                      Page 1 of 1
APPLICATION NO.   : 13/131404
DATED             : October 1, 2013
INVENTOR(S)       : Marcel Gregorius Anthonius Ruizenaar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 197 days.

Signed and Sealed this
Fifteenth Day of September, 2015

Michelle K. Lee
*Director of the United States Patent and Trademark Office*